United States Patent Office 3,518,108
Patented June 30, 1970

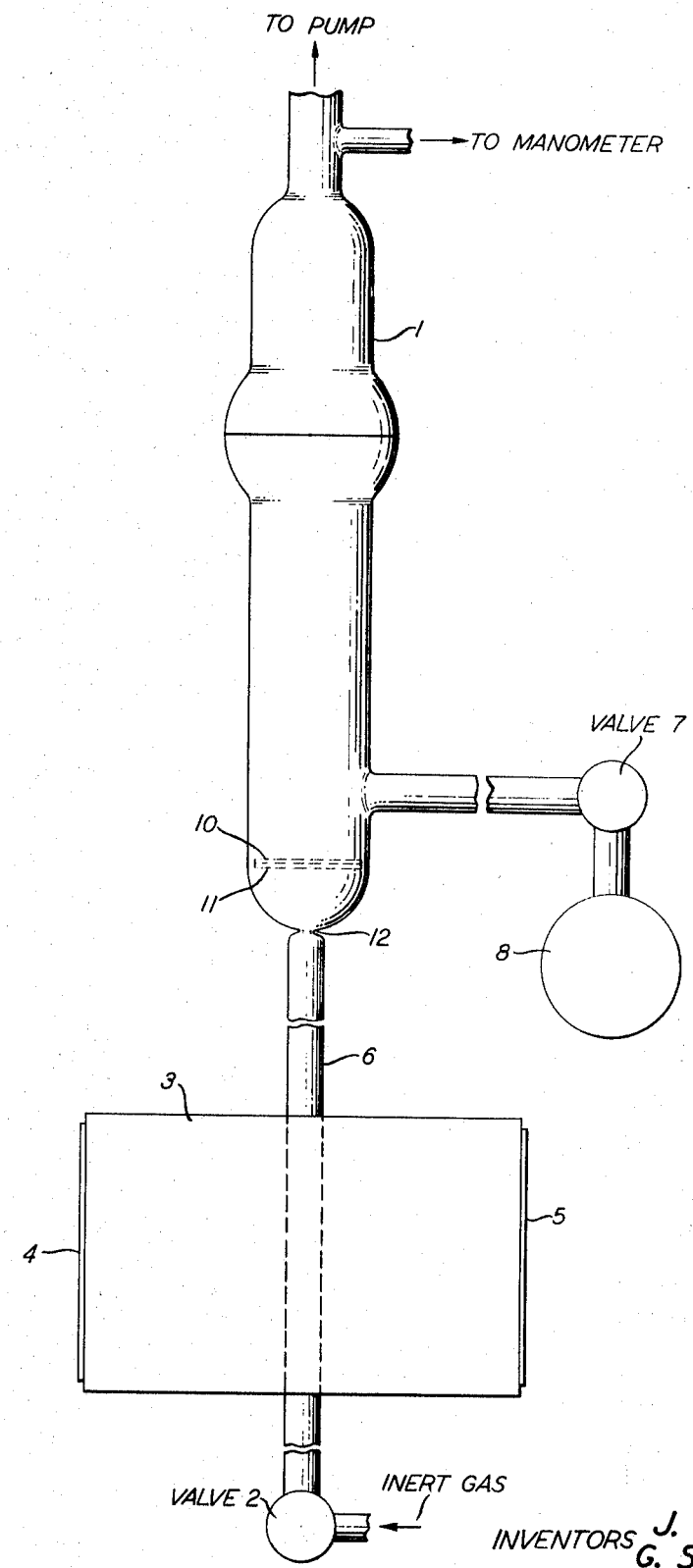

3,518,108
POLYMER COATING BY GLOW DISCHARGE TECHNIQUE AND RESULTING PRODUCT
John H. Heiss, Jr., Union, and Gerald Smolinsky, Berkeley Heights, N.J., assignors to Bell Telephone Laboratories, Incorporated, Murray Hill, N.J., a corporation of New York
Filed June 8, 1967, Ser. No. 644,503
Int. Cl. C08f 1/22, 13/00; B44d 1/02
U.S. Cl. 117—93
8 Claims

ABSTRACT OF THE DISCLOSURE

Polymer coatings are produced by contacting an organic species with an inert gas plasma. Resulting coatings manifest dielectric properties of device interest.

BACKGROUND OF THE INVENTION

Field of the invention

The invention is concerned with the preparation of polymer coatings and with the resulting product. Such coatings are of interest in printed circuitry, where they may serve as capacitor dielectrics, as insulation, or simply as protective layers. Any of these uses involve single components or multi-component circuitry.

Description of the prior art

Film capacitors in some sophisticated circuitry are now generally prepared by sputtering and anodizing techniques. An illustrative device is prepared by sputtering of tantalum, anodizing the sputtered layer, and constructing a counterelectrode, often by evaporation. Such film-formed capacitors are widely used and constitute a significant part of the printed circuitry technology.

Continuing work during recent years has been directed to the development of structures alternative to that of the sputtered film capacitor. Much of this work involves the in situ polymerization of a dielectric film over an electrode region followed by deposition of a counter electrode. One such technique depends upon the deposition of polyparaxylylene from an unstabilized dimer species. While this general approach has been successfully applied, the reacted material is expensive and is handled only with difficulty due to its reactivity. Attempts to substitute more economical starting materials are thwarted by the special requirements inherent in the process. (See Journal of Polymer Science, Part A-1, volume 4, pages 3027–3029 (1966) "A New, General Synthetic Method for the Preparation of Linear Poly-p-Xylylenes" by W. F. Gorham.)

Another approach relies on the glow discharge polymerization of simple organic species (44 Transactions of the Institute of Metal Finishing (1966); 118 Proceedings of the IEE 1614 (August 1965)). This process is not subject to the limitations of the polyparaxylylene polymerization technique and may make use of a variety of comparatively inexpensive reactants. This polymerization mechanism is, however, quite difficult to control, and films are often contaminated by products resulting from reaction of high energy breakdown products. Restriction of the glow discharge products to the desired reactants requires careful selection and monitoring of the plasma-producing energies.

A related procedure involves exposure of reactant material to an active plasma species such as nitrogen which is intended to and which does enter into the polymer. (See Canadian Journal of Chemistry, volume 44, pages 1230–1231 (1966) (and paper cited) "Reactions of Active Nitrogen With Organic Substrates IV. Isoprene" by T. Hanafusa and N. N. Lichtin.) The resulting polymer, while of possible device interest, is generally undesirable for use in capacitor dielectric layers by virtue of the relatively high loss tangent values resulting from the polar nature of the polymer.

SUMMARY OF THE INVENTION

Polymer coatings are produced by interaction with an inert gas plasma of helium, neon, argon, krypton, xenon, or hydrogen. The plasma is produced by glow discharge of the concerned gas at a position removed from that of the polymerization site. Resulting coatings may be essentially pure hydrocarbons and manifest loss tangent values approaching those characteristic of the bulk polymers produced by conventional means. Such coatings, as well as capacitors utilizing such coatings, constitute embodiments of the invention.

Since the glow discharge is utilized solely to produce the inert gas plasma, energy level is noncritical and the process is easily controlled. In a preferred embodiment, operating parameters are selected by the simple expedient of introducing sufficient reactant to quench the discharge in the vicinity of the substrate. It is found that such conditions result in a generally homogeneous product without evidence of polymer products resulting from more advanced breakdown of the reactants. Other operating parameters are generally based on known principles or simply on the basis of expediency. All such conditions are adequately described in the detailed description.

BRIEF DESCRIPTION OF THE DRAWING

The figure is a diagrammatic representation of apparatus suitable for carrying out the inventive process.

DETAILED DESCRIPTION

Referring again to the figure, the apparatus includes a vessel 1 in which polymerization takes place, and a valve 2 through which any of the inert gases discussed is introduced into plasma activator 3. Plasma is generated by means of electromagneitc energy applied across external capacitor plates 4 and 5 by means not shown and resultant plasma flows through tube 6 into vessel 1. Reactant material is contained within flask 8 and vapor evolving therefrom is introduced into vessel 1 through valve 7. Flow of vapor through 7 is maintained at a level sufficient to substantially quench the glow discharge within vessel 1. With the assistance of a pressure indicating device such as a manometer, pressure is maintained at a level which results in polymer deposition. Such deposition takes place on substrate 10, which rests on disk 11. Under certain conditions it has been found that a constriction such as 12 in tube 6 aids in preventing substantial back flow of reactant vapor to the plasma activator 3. Substantial back flow may result in progressive breakdown of the reactant with concomitant contamination.

General requirements and operating parameters are set forth below under appropriate subtitles:

(1) *Reactants.*—Reactant materials need not be limited to conventional monomers, although such may be utilized. Broadly, reactants which have been utilized, all of which have resulted in device-grade coatings, fall in three broad categories: aromatics, aliphatics, and silicones. Exemplary materials are set forth in the examples. Representative reactants include the aromatics: toluene, benzene, xylene, styrene, chlorobenzene and pyridine; the saturated aliphatics: hexane, heptane, cyclohexane, butanol, heptanone, ethyl butyrate, tetrahydrofuran, butyl chloride, and perfluorohexane; the unsaturated aliphatics: cyclohexene, dimethyl hexadiene, butene-1-ol, valeronitrile and chloropropene; and the low molecular weight silicones such as poly[dimethylsiloxane]. Few demands are placed on the nature of the reactants. The general requirement is that the material have sufficient vapor pressure to enter the reaction chamber in vapor form. All of the simple organic compounds have sufficient room temperature vapor pressure to accomplish this end. The reaction may be accelerated by heating the reactants to increase their vapor pressure. Where this is done, and even where it is not, it may be desirable to heat the walls of the reaction chamber to minimize deposition on such surfaces. Where minimum values of loss tangent, tan δ, are desired, preferred reactants are unsubstituted hydrocarbons.

While most of the work is described in terms of a single organic reactant species, any combination of materials within the listed categories may be utilized. Also, while the polymerization process gives rise to no requirement for maximum tolerable impurity content, desired device characteristics generally place a preferred maximum of about one percent by weight on non-reactant content.

(2) *Gas plasma.*—Permitted gases are helium, neon, argon, krypton, xenon or hydrogen. Use may be made of mixtures. However, under usual conditions, only the lower activation energy gas will enter into the reaction. Permitted impurity levels are considered separately, since vapor contamination may result from the vacuum pump or from leaks in the system, as well as from the introduced inert gas. It is, however, important to exclude contaminants which may enter into the reaction to result in polar characteristics. Nitrogen, in particular, is to be excluded. Undesirable contaminants also include oxygen, which may impede the polymerization process, and carbonaceous gases, which break down during reaction. Generally, ordinary commercial purities, that is, total impurity content of below 0.005 percent by weight, are suitable. Much of the described work was carried out using argon. Use of this gas is considered to be preferred, since it is readily available and since it has a comparatively low ionization potential (about 15.7 electron volts).

(3) *Contamination.*—In the experimental system which was used to produce many of the described coatings, contamination resulted largely from leaks in the system. Such leaks result not only in difficulty in maintaining the desired vacuum level, and in some variation in quenching conditions, but also result in introduction of nitrogen and oxygen. It has been indicated that nitrogen readily enters the reaction and imparts a polar nature to the resulting product. It has been found that loss tangents within about an order of magnitude of the bulk values may still be obtained if contaminants introduced through leakage do not exceed a total amount of about three volume percent of the entire contents of the reaction chamber.

GENERAL OUTLINE OF PROCESS

This description is in terms of the figure. The process is commenced by pumping chamber 1 to the desired pressure. Under ordinary conditions, operating pressure should not exceed about 5 millimeters of mercury. Since deposition rate ordinarily levels off at about 2 millimeters of mercury, this represents a preferred maximum. Operation above such upper limit is permitted for higher organic reactant pressure which may, in turn, result by use of more volatile material or by heating the reactant. There is no absolute lower pressure limit other than that introduced by the vapor pressure of the reactant itself and the lower limit indicated is dictated primarily by expediency. The pressure to which chamber 1 is initially evacuated is genreally somewhat less than that of the operating pressure, since introduction of plasma and reactant increases the value. Ordinarily mechanical vacuum pumps may have capabilities of the order of about 0.001 mm. of mercury, and use of such initial levels is expedient. Once chamber 1 has been evacuated to the desired level, inert gas is introduced through valve 2 into plasma activator 3. Plasma is generated in 3 by any suitable means, as by use of radio frequency energy applied across capacitative plates 4 and 5. In much of the work reported herein, power input was between 150 and 200 watts at a frequency of 13.56 megahertz. Any power level and frequency resulting in a glow discharge is acceptable.

Upon energizing activator 3, a glow discharge results, with the lighted area extending through connecting path 6 into vessel 1.

Valve 7 is now opened, so that vapor evolving from organic substances within flask 8 is allowed to pass into chamber 1. Some quenching immediately results. Valve 7 is adjusted so that the discharge within vessel 1 is just barely quenched. While it has been observed that deposition may occur with some discharge in 1, separation of the two procedures, that is, plasma formation and polymer deposition, are best isolated, so as to avoid progressive breakdown by completely quenching the discharge at the deposition site.

With the vacuum level in vessel 1 maintained within the indicated range, the process is continued for the desired period. On the experimental apparatus used, with the substrate 10 about 3.5 centimeters in diameter and with a path length 6 of about 160 centimeters, coatings of the order of 100 A. in thickness or greater are produced at exposure times of the order of from several minutes to a major fraction of an hour.

EXAMPLES

Process runs were carried out under generally uniform conditions to produce the selected examples which are set forth in tabular form below. Operating pressure was maintained at about .05 mm. of mercury. In the examples, the inert gas plasma was argon, and organic reactant vapor introduced was that due to the room temperature partial pressure of the material itself. No part of the apparatus was intentionally heated or cooled. All the coatings upon which the examples are based were produced on a metallized plastic polyethylene terephthalate substrate (the metallized layer was a 3000 A. thick layer of aluminum). All coatings were tested and determined to be suitable as capacitor dielectrics. All coatings for which data are reported on the table were substantially pinhole free. Capacitor measurements were made using an aluminized counterelectrode of a thickness of about 1000 A. The final column entry is the tan δ value measured at 1.0 kHz. in accordance with the relationship:

$$\tan \delta = R_A \omega C$$

where $R_A$ = Effective resistance in ohms
$C$ = Capacitance in farads
$\omega = 2\pi$ frequency

| Example | Reactant | 1 kHz capacitance, pf/cm.$^2$ | Approx. thickness in microns | 1 kHz tan δ |
|---|---|---|---|---|
| 1a | Toluene | 3,700 | 0.89 | 0.0013 |
| 1b | do | 13,000 | 0.16 | 0.0067 |
| 2 | Benzene | 2,400 | 0.92 | 0.0062 |
| 3 | Xylene | 4,000 | 0.50 | 0.0028 |
| 4 | Styrene | 2,500 | 0.92 | 0.0005 |
| 5a | Chlorobenzene | 375,000 | 0.01 | 0.029 |
| 5b | do | 22,000 | 0.17 | 0.0054 |
| 6 | Pyridine | 214,000 | 0.012 | 0.018 |
| 7 | Hexane | 12,000 | 0.20 | 0.0034 |
| 8 | Heptane | 9,000 | 0.27 | 0.0019 |
| 9 | Cyclohexane | 8,000 | 0.25 | 0.0087 |
| 10 | Butanol-1 | 3,800 | 0.83 | 0.0034 |
| 11 | 2-heptanone | 5,200 | 0.57 | 0.0062 |
| 12 | Ethyl butyrate | 8,700 | 0.34 | 0.0065 |
| 13a | Tetrahydrofuran | 103,000 | 0.03 | 0.0078 |
| 13b | do | 5,000 | 0.60 | 0.0039 |
| 14a | Isobutyl chloride | 300,000 | 0.011 | 0.033 |
| 14b | do | 29,000 | 0.11 | 0.019 |
| 15 | Perfluorohexane | 57,000 | 0.04 | 0.0035 |
| 16 | Cyclohexene | 28,000 | 0.07 | 0.014 |
| 17 | 2,5 dimethyl, 2,4 hexadiene. | 27,000 | 0.10 | 0.0026 |

| Example | Reactant | 1 kHz capacitance, pf/cm.² | Approx. thickness in microns | 1 kHz tan δ |
|---|---|---|---|---|
| 18a | 2 butene-1-ol | 85,000 | 0.032 | 0.012 |
| 18b | do | 7,500 | 0.36 | 0.016 |
| 19a | Valeronitrile | 280,000 | 0.012 | 0.014 |
| 19b | do | 29,000 | 0.12 | 0.011 |
| 20a | Chloropropene | 201,000 | 0.016 | 0.019 |
| 20b | do | 14,000 | 0.21 | 0.0062 |
| 21 | Poly[dimethylsiloxane] | 3,000 | 0.98 | 0.0026 |

As was expected, layer thickness was found to be linearly related to exposure time. The following examples, carried out under the conditions set forth before the table, illustrate the relationship. All utilized toluene as the starting reactant.

Example 22.—Exposure was carried out for fifteen minutes at a pressure of .05 millimeter of mercury. A 1000 A. thick aluminized counterelectrode was produced by vapor deposition. The resulting capacitor had a capacitance value of 13,000 picofarads/cm.².

Example 23.—Example 22 was repeated, with an exposure time of 30 minutes. The resultant device had a capacitance of 6000 picofarads/cm.².

Example 24.—Conditions of Example 22 were again utilized in the preparation of a polymer coating from toluene except that exposure time was 60 minutes. Capacitance was about 3000 picofarads.

Example 25.—The process of Example 22 was repeated, with an exposure time of 120 minutes. The resultant capacitance was about 1500 picofarads.

All of the capacitors of Examples 22 through 25 evidenced tan δ values between .004 and .008; all were substantially pin hole free.

On the basis of other experimental information, it was found feasible to prepare capacitors having capacitance values of several tenths of a microfarad/cm.². Thicknesses of such coatings were estimated to be about 100 A. Tan δ values, even in such extreme instance, were about 0.030. Generally, it was found that the polymer layers prepared in accordance with the invention had the excellent chemical and physical stability associated with conventionally prepared polymers. It was also found that patterns of deposited coatings could be sharply defined by any of the usual masking techniques used in printed circuitry.

It has been indicated that the advantages of the process derived in large part from the improved control which results from a substantial separation of the plasma generation and the polymerization reactions. Procedurally, these functions are adequately separated simply by operating under conditions such that glow discharge is substantially quenched in the vicinity of the substrate. It is expedient, but not necessary, to carry out the two reactions in separate vessels. Where a single vessel is used, it continues to be desirable to prevent any substantial back flow of organic reactant to the plasma generation site. This may be accomplished for example, by means of a constriction or by use of an inserted baffle. Permitting any substantial amount of reactant to flow back into the plasma generation location may result in progressive breakdown of reactant, so as to result in the very condition that the inventive process is designed to overcome.

The invention has been described in terms of a limited number of embodiments. Compared to the closest prior art, it depends upon the physical separation of plasma generation and polymerization. This is achieved by use of an inert gas plasma, that is, generation of a plasma within a gas which does not enter into the polymerization reaction and in the prevention of direct activation of the reactant. This latter is achieved by operating under conditions such that the glow discharge region does not extend to the polymerization site, as may be visually determined. This condition is most easily achieved by separating the chambers in which the two reactions take place. It is intended that the scope of the appended claims be so construed as to encompass all process and apparatus variations achieving such separation.

What is claimed is:

1. Process for producing a polymer coating on a substrate comprising the steps of disposing said substrate in an enclosed space generating a plasma by creating a glow discharge in an inert gas environment consisting essentially of at least one gas selected from the group consisting of helium, neon, argon, krypton, xenon, and hydrogen, said environment being remote from but connected to said enclosed space by fluid flow means and causing the resulting plasma and a vaporous hydrocarbon-containing reactant to flow together into said space in the vicinity of the substrate under a maximum pressure of 5.0 millimeters of mercury and at a flow rate for said hydrocarbon-containing reactant such that the region of glow discharge is substantially quenched in the vicinity of the substrate.

2. Process of claim 1 wherein the cross-sectional area of said fluid flow means is reduced with respect to the cross-sectional area of said enclosed area normal to the flow direction whereby the glow discharge is prevented from extending into said enclosed space.

3. Process of claim 1 in which the said inert gas is argon.

4. Process of claim 1 in which the said reactant is an unsubstituted hydrocarbon.

5. Process of claim 4 in which the said reactant is an aromatic compound.

6. Process of claim 5 in which the said reactant is toluene.

7. Process of claim 1 in which the surface of the said substrate is electrically conductive.

8. Process for producing a plural coated substrate having a first coating comprising a polymer and a second coating comprising an electrically conductive material covering at least a portion of the surface of the said first coating comprising the steps of disposing said substrate in an enclosed space generating a plasma by creating a glow discharge in an inert gas environment consisting essentially of at least one gas selected from the group consisting of helium, neon, argon, krypton, xenon, and hydrogen, said environment being remote from but connected to said enclosed space by fluid flow means and causing the resulting plasma and a vaporous hydrocarbon-containing reactant to flow together into said space in the vicinity of the substrate under a maximum pressure of 5.0 millimeters of mercury and at a flow rate for said hydrocarbon-containing reactant such that the region of glow discharge is substantially quenched in the vicinity of the substrate and applying an electrically conductive coating on at least a portion of the surface of the polymer coating so produced.

References Cited

UNITED STATES PATENTS

| | | | |
|---|---|---|---|
| 3,069,283 | 12/1962 | Coleman | 117—93 X |
| 3,297,465 | 1/1967 | Connell et al. | 117—93.31 X |
| 3,309,299 | 3/1967 | Mantell | 204—165 |

ALFRED L. LEAVITT, Primary Examiner

J. H. NEWSOME, Assistant Examiner

U.S. Cl. X.R.

117—230; 204—170